April 27, 1954 T. G. HARE 2,676,610
VALVE WITH BALL BEARING MOUNTED SEAL
Filed July 5, 1952
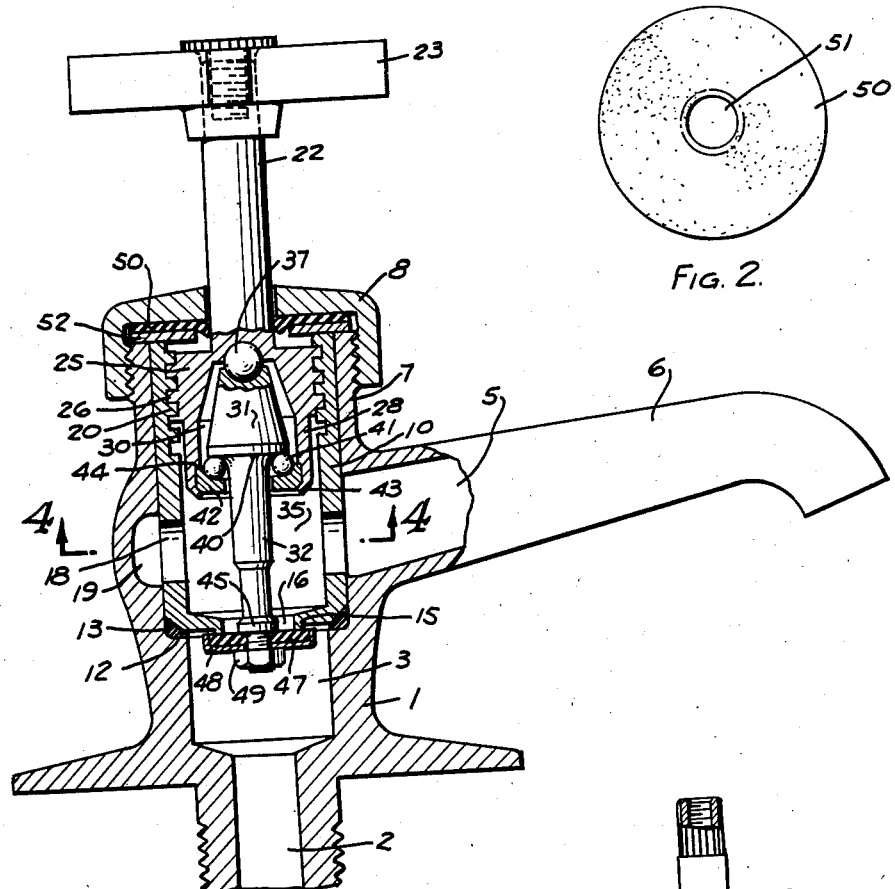
FIG. 1.
FIG. 2.
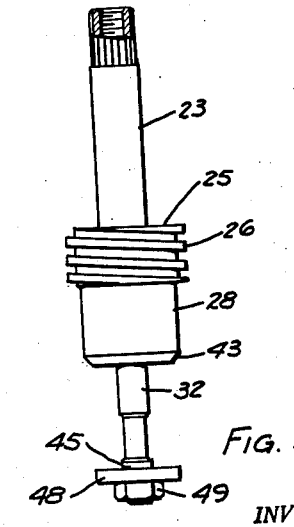
FIG. 3.
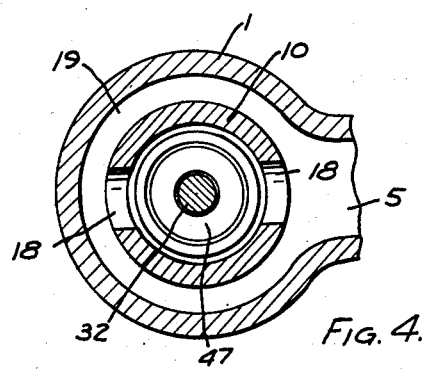
FIG. 4.
INVENTOR.
TERENCE G. HARE
BY
Barnes, Kisselle, Laughlin & Raisch
ATTORNEYS.

Patented Apr. 27, 1954

2,676,610

UNITED STATES PATENT OFFICE 2,676,610

VALVE WITH BALL BEARING MOUNTED SEAL

Terence G. Hare, Detroit, Mich., assignor to Miller Manufacturing Co., Detroit, Mich., a corporation of Michigan Application July 5, 1952, Serial No. 297,359

3 Claims. (Cl. 137—454.6)

This invention relates to a valve particularly of the type for controlling flow of water, and it has to do with a valve of the faucet type wherein the movable valve member shifts against the direction of flow of the water when the valve is opened and shifts with the direction of movement of the water when the valve is closed.

An object of the invention is to provide an improved valve or faucet construction wherein a valve of the type mentioned has an anti-friction bearing arrangement interposed between a rotatable control member and the valve seal. In accordance with the invention the valve embodies a rotatable valve controlling member mounted on threads so that it shifts axially and it is connected by means of an anti-friction bearing to the valve sealing member, so that when the sealing member comes to rest upon its seat, it may sit thereon without rotation while the controlling member is turned on its threads to tighten the engagement.

A valve constructed in accordance with the invention is shown in the accompanying drawings:

Fig. 1 is a view largely in cross section showing a valve constructed in accordance with the invention.

Fig. 2 is a plan view of a stem sealing member.

Fig. 3 is a view largely in elevation with some parts cut away and parts shown in section showing the controlling member and valve seal mounted thereon.

Fig. 4 is a cross sectional view taken substantially on line 4—4 of Fig. 1.

The valve has a body 1 with an inlet passage 2 leading to a chamber 3. The body has an outlet passage 5 in a suitable extension or spigot 6. An extension 7 is externally screw threaded as shown for the reception of a cap 8 apertured as indicated for the passage therethrough of the controlling stem.

Situated within the body is an insert or cage 10. This cage is generally of cylindrical form and is positioned by means of an internal shoulder 12 in the body with an interposed sealing washer 13. The bottom portion of the cage constitutes a partition and is provided with a valve seat 15 surrounding or bounding a valve opening 16.

This cage is provided with ports 18 generally in alignment with the outlet passage 5. In this connection the body may have an enlargement providing a passageway 19 which is in registry with the ports and also with the outlet passage 5 shown in Fig. 4.

The cage is internally threaded as at 20 and is arranged to be held against the shoulder 12 or interposed sealing member 13 when the cap 8 is tightened to the body.

An operating stem 22 with a suitable handle 23 extends through the cap and this stem may have an integral body portion 25 with threads 26 engaging the threads 20. The body portion is hollow as shown at 30 in Fig. 1 and it has a depending circumferential flange 28.

The hollow or cavity 30 is partially defined by the circumferential flange 28. It has disposed therein the head portion 31 of a valve seal stem 32. This construction provides a chamber 35 on the side of the valve passage 16 opposite the chamber 3. The head 31 has a thrust transmitting connection with the operating stem and as shown in Fig. 1 this takes the form of a single ball 37 disposed between the end of the head 31 and the top of the cavity 30 which in effect is at the end of the stem 22. At the intersection of the valve seal stem 32 and the head 31 there is formed a race formation 40 for receiving an annular array of balls 41 which operate thereon. An oppositely disposed race member 42 is secured to the depending flange 28 as by means of fashioning the end of the flange over the race 42 as shown at 43. This race member 42 is engaged against and located by the shoulder on the interior of the flange 28.

The stem 32 projects through the valve passage 16. It is provided with a shoulder 45 for locating a seal member 47 which may be of suitable rubber, either natural or synthetic or of other material, and which is held in posiiton by a retainer 48 held by a nut 49.

A stem seal member is illustrated at 50. This member is in the form of a disc of natural or synthetic rubber. It is disposed under the cap as shown with the stem 22 passing through the central aperture 51 therein. Underlying the sealing washer 50 is a washer 52. The aperture in the washer 52 is larger than that in the sealing member 50 as indicated. One form of constructiion is to provide the aperture 51 in the washer 50 of a smaller diameter than that of the operating stem 22. Therefore, the inner zone of the sealing washer is flexed inwardly as shown to embrace the stem 22. On the other hand, the washer 50 may be preformed to the shape as substantially shown in Fig. 1. Suffice it to say that when the valve is open, the stem sealing washer 50 prevents escape of water around the stem.

The valve is shown in closed position in Fig. 1.

To open the valve the stem is turned and due to its threaded mounting, it shifts downwardly as Fig. 1 is viewed, thus removing the seal member 7 from its seat. Water may thus flow from the chamber 3 into the chamber 35 and out through the spigot. As mentioned above, the water is prevented from escaping around the stem by the sealing washer 50. In the opening of the valve any thrust that is required is transmitted to the head 31 by the ball 37. Thus, the operating stem may rotate, while thrusting the seal stem 32 and its head without rotation of the seal stem 32. When the valve is to be closed the operating stem is turned in the opposite direction and the valve seal member 47 brought up against its seat 15. If the valve be tightly closed the stem 22 is turned but due to the ball bearing construction 41 the stem 32 may turn while the valve member 47 comes to rest upon its seat without turning relative to the seat. Thus the sealing member, being not rotated on its seat has a prolonged life. The sealing member 47 may be changed or renewed by removing the cage.

I claim:

1. In a valve having a valve body with a chamber therein and an inlet passage and an outlet passage, a valve operating assembly comprising, a cage member slidably inserted in the body and having a radially inwardly extending end portion constituting a partition dividing the chamber into an inlet section and an outlet section connecting respectively with the inlet and outlet passages, the partition having a valve opening therein bounded by a valve seat, the cage having internal threads on the outlet side of the partition, an operating member having a body part positioned within the cage and mounted on said threads and having a projecting operating stem, a valve stem extending through the valve opening, a seal member mounted on the valve stem and positioned on the inlet side of the partition and arranged to engage the valve seat on the inlet side thereof, the operating member having a cavity therein, the valve stem having a head positioned in the cavity, the underside of the head constituting a raceway, means providing a raceway adjacent the open end of the cavity, and an annular array of balls positioned between the raceways for rotatably connecting the operating member and valve stem.

2. In a valve having a valve body with a chamber, an inlet passage and an outlet passage, the chamber having an open end and having an internal shoulder, a valve operating assembly comprising, an inner member slidably fitted in the chamber and arranged to engage the shoulder, the inner member having a radially inwardly extending part near its inner end constituting a partition dividing the chamber into an inlet section and an outlet section connecting respectively with the inlet and outlet passages, a cap threaded to the body for closing the open end of the chamber and for holding the inner member on said shoulder, the inner member having internal threads, the partition having a valve opening therein bounded by a valve seat, an operating member having a body part disposed within and mounted on the threads of the inner member on the outlet side of the partition, and having an operating stem extending through the cap, the body part having a recess therein opening toward the partition, a valve stem having a head positioned in the recess and extending therefrom through said valve opening, a single ball positioned between the end of the head and the inner end of the recess, means carried by the body member adjacent the open end of its recess and constituting a race, an annulus of balls positioned between said head and said race, whereby the stem is rotatable relative to the body part, the single ball and the annulus of balls adapted to transmit axial forces to the stem in opposite directions, a seal member mounted on the end of the stem and positioned on the inlet side of the valve seat, the body of the operating stem being operable on said threads rotatably to shift the stem and the seal member axially for moving the seal member to and from engagement with said seat.

3. In a valve having a valve body with a chamber, an inlet passage and an outlet passage, the chamber having an open end and having an internal shoulder, a valve operating assembly comprising, an inner member slidably fitted in the chamber and arranged to engage the shoulder, the inner member having a radially inwardly extending part near its inner end constituting a partition dividing the chamber into an inlet section and an outlet section connecting respectively with the inlet and outlet passages, a cap threaded to the body for closing the open end of the chamber and for holding the inner member on said shoulder, the inner member having internal threads, the partition having a valve opening therein bounded by a valve seat, an operating member having a body part disposed within and mounted on the threads of the inner member on the outlet side of the partition, and having an operating stem extending through the cap, the body part having a recess therein opening toward the partition, a valve stem having a head positioned in the recess and extending therefrom through said valve opening, means providing a rotatable engagement between the end of the head and the inner end of the recess, means carried by the body member adjacent the open end of its recess and constituting a race, an annulus of balls positioned between said head and said race, whereby the stem is rotatable relative to the body part, the said means providing the rotatable engagement and the annulus of balls adapted to transmit axial forces to the stem in opposite directions, a seal member mounted on the end of the stem and positioned on the inlet side of the valve seat, the body of the operating stem being operable on said threads rotatably to shift the stem and the seal member axially for moving the seal member to and from engagement with said seat.

References Cited in the file of this patent
UNITED STATES PATENTS

| Number | Name | Date |
|---|---|---|
| 862,614 | Davey | Aug. 6, 1907 |
| 1,140,510 | Gardner | May 25, 1915 |
| 1,148,441 | Brown | July 27, 1915 |
| 1,668,455 | Horn et al. | May 1, 1928 |
| 2,352,249 | Briggs | June 27, 1944 |
| 2,496,679 | Saurer | Feb. 7, 1950 |